(12) United States Patent
Miyachi et al.

(10) Patent No.: US 6,609,833 B1
(45) Date of Patent: Aug. 26, 2003

(54) LATCHING SYSTEM FOR CONNECTOR ASSEMBLIES

(75) Inventors: Akihiro Miyachi, Fuchu (JP); Masashi Seto, Kanagawa (JP); Kenji Watanabe, Atsugi (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/614,788

(22) Filed: Jul. 12, 2000

(30) Foreign Application Priority Data

Jul. 12, 1999 (JP) .......................................... 11-197505

(51) Int. Cl.⁷ ........................... G02B 6/36; H01R 13/627
(52) U.S. Cl. ........................ 385/56; 385/60; 439/352; 439/357
(58) Field of Search ............................... 385/53, 55, 56, 385/58, 60, 62, 65, 67; 439/352, 357, 680

(56) References Cited

U.S. PATENT DOCUMENTS

| | | | |
|---|---|---|---|
| 5,082,345 A | * | 1/1992 | Cammons et al. ............. 385/60 |
| 5,445,534 A | * | 8/1995 | Ishizuka et al. ............. 439/352 |
| 5,580,268 A | * | 12/1996 | Miyazawa ................... 439/352 |
| 5,830,001 A | * | 11/1998 | Kinoshita et al. ............ 439/354 |
| 5,940,559 A | * | 8/1999 | Noll ............................. 385/53 |
| 5,971,625 A | * | 10/1999 | Lu ................................ 385/60 |

* cited by examiner

*Primary Examiner*—Michael C. Zarroli
(74) *Attorney, Agent, or Firm*—A. A. Tirva

(57) ABSTRACT

A connector assembly includes a plug connector having a plug housing and a sheath movably mounted about the plug housing. A receptacle connector receives the plug connector in mated condition. A primary latch is provided between the plug housing and the receptacle connector for holding the connectors in mated condition. A release is provided on the sheath for unlatching the primary latch means in response to movement of the sheath relative to the plug housing. A secondary latch is provided between the plug housing and the receptacle connector for holding the connectors in mated condition in the event of inadvertent unlatching of the primary latch means. An interengaging press-fit rib-and-slot structure is provided between the plug connector and the receptacle connector when the connectors are mated.

21 Claims, 5 Drawing Sheets

LATCHING SYSTEM FOR CONNECTOR ASSEMBLIES

FIELD OF THE INVENTION

This invention generally relates to the art of connector assemblies, such as fiber optic connector assemblies, electrical connector assemblies and the like, and particularly to a latching system for such connector assemblies.

BACKGROUND OF THE INVENTION

A connector assembly, such as a fiber optic connector assembly or an electrical connector assembly, typically includes a pair of mating connectors, such as plug and receptacle connectors sometimes called male and female connectors. The mating connectors sometimes include interengaging latch means to hold the connectors in mated condition. A typical latch means is provided by a flexible latch arm on one of the connectors latchingly engageable with a latch boss on the other of the connectors.

One type of plug connector for mating with a receptacle connector includes a plug housing and a sheath mounted on the plug housing. The interengaging latch means between the plug and receptacle connectors is provided by a flexible latch arm on the receptacle connector latchingly engageable with a latch boss on the sheath of the plug connector. The latch boss is moved out of engagement with the latch arm when the connectors are unmated. Unfortunately, such systems can result in inadvertent unmating of the connectors. Attempts have been made to solve this problem by increasing the strength of the resilient latch arm, but the resilient strength of the latch arm cannot be increased without undesirably increasing the mating and unmating forces on the connectors. The present invention is directed to solving these problems by providing a redundant latch means between the receptacle connector and the plug housing of the plug connector. The sheath has a release for unlatching one of the latch means in response to movement of the sheath relative to the plug housing, but the redundant latch means maintains the connectors in mated condition not with standing inadvertent movement of the sheath. A press-fit rib-and-slot means also is provided between the plug housing of the plug connector and the receptacle connector to eliminate looseness between the connectors.

SUMMARY OF THE INVENTION

An object, therefore, of the invention is to provide a new and improved latching system for connector assemblies of the character described.

In the exemplary embodiment of the invention, a connector assembly includes a plug connector having a plug housing and a sheath movably mounted about the plug housing. A receptacle connector receives the plug connector in mated condition. Primary latch means are provided between the plug housing of the plug connector and the receptacle connector for holding the connectors in mated condition. Release means are provided on the sheath of the plug connector for unlatching the primary latch means in response to movement of the sheath relative to the plug housing. Secondary latch means are provided between the plug housing and the receptacle connector for holding the connectors in mated condition in the event of inadvertent unlatching of the primary latch means.

Another feature of the invention includes a press-fit rib-and-slot means between the plug housing of the plug connector and the receptacle connector when the connectors are in mated condition. This eliminates looseness between the connectors.

According to one aspect of the invention, the primary latch means include a flexible latch arm on one of the plug housing and receptacle connector engageable with a complementary latch member on the other of the plug housing and receptacle connector. In the preferred embodiment, the flexible latch arm is on one side of the receptacle connector and is engageable with a latch boss on one side of the plug housing of the plug connector. The release means comprises a release shoulder on the sheath engageable with the flexible latch arm in response to movement of the sheath relative to the plug housing.

According to another aspect of the invention, the secondary latch means include at least one flexible latch member on one of the plug housing and receptacle connector releasably engageable with a complementary latch member on the other of the plug housing and receptacle connector. In the preferred embodiment, the secondary latch means include a pair of the flexible latch members on opposite sides of the receptacle connector releasably engageable with a pair of latch bosses on opposite sides of the plug housing of the plug connector.

The rib-and-slot means include a rib on the receptacle connector press-fit into a slot in the plug housing of the plug connector. The rib is elongated in the mating direction of the connectors. In the preferred embodiment, the slot extends in both the plug housing and the sheath of the plug connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESRIPTION OF THE PREFERRED EMBODIMENT

Figure 1:
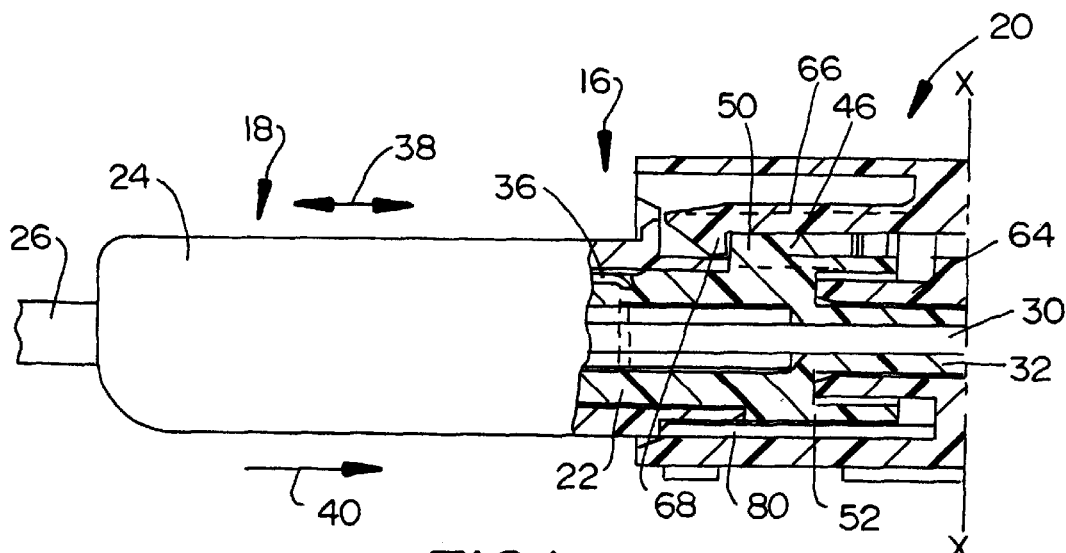
FIG. 1 is a fragmented, longitudinal section through a fiber optic connector assembly according to the invention, with the plug and receptacle connectors in mated condition.
Figure 2:
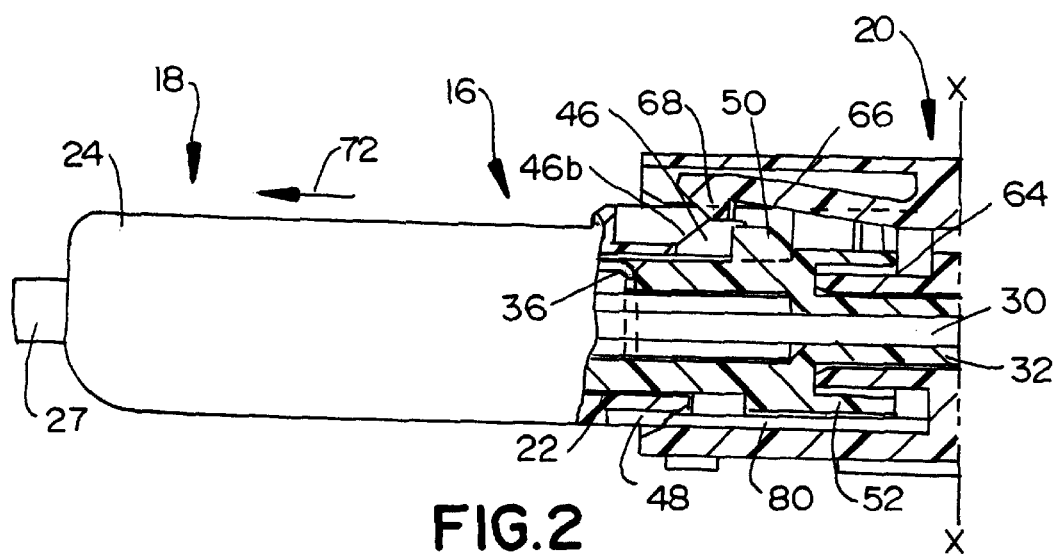
FIG. 2 is a view similar to that of FIG. 1, but with the sheath of the plug connector moved to release the primary latch means between the plug housing of the plug connector and the receptacle connector.

Referring to the drawings in greater detail, and first to FIGS. 1 and 2, the invention is embodied in a fiber optic connector assembly, generally designated 16, which includes a plug connector, generally designated 18, mateable in a receptacle connector, generally designated 20. Although the invention is shown as embodied in a fiber optic connector assembly, the concepts of the invention are equally applicable in electrical connector assemblies or the like.

Figure 3:
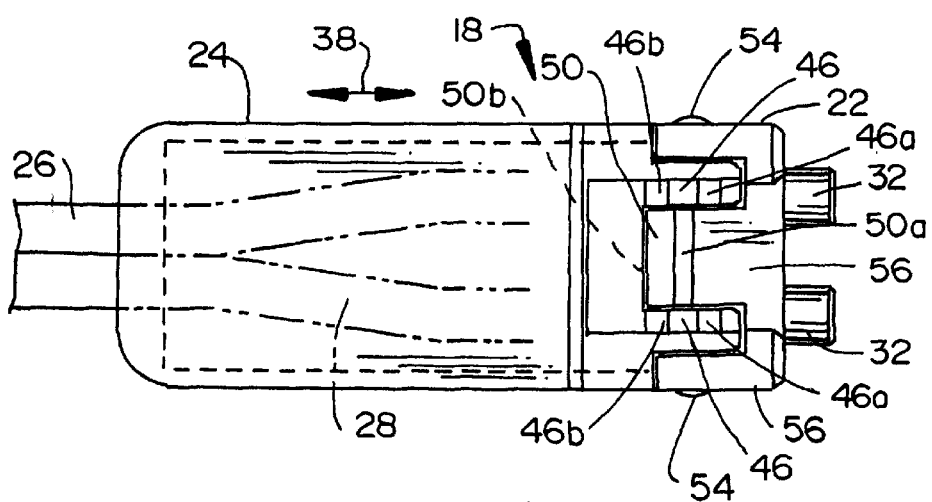
FIG. 3 is a top plan view of the plug connector of the connector assembly.
Figure 4:
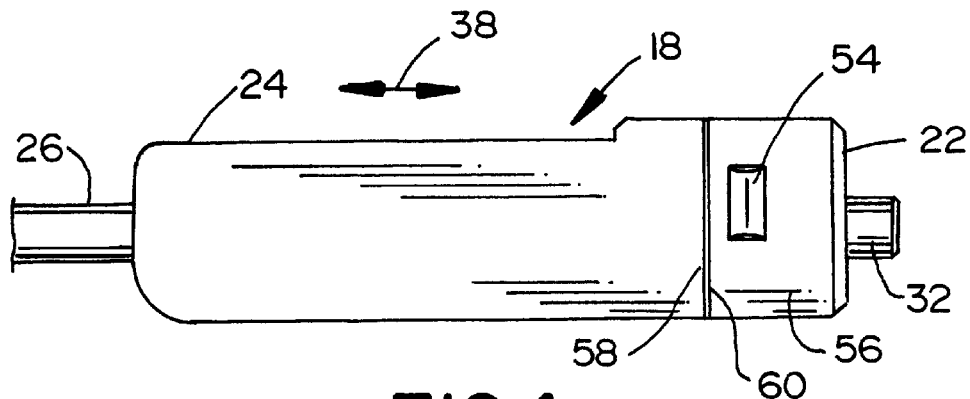
FIG. 4 is a side elevational view of the plug connector.
Figure 5:
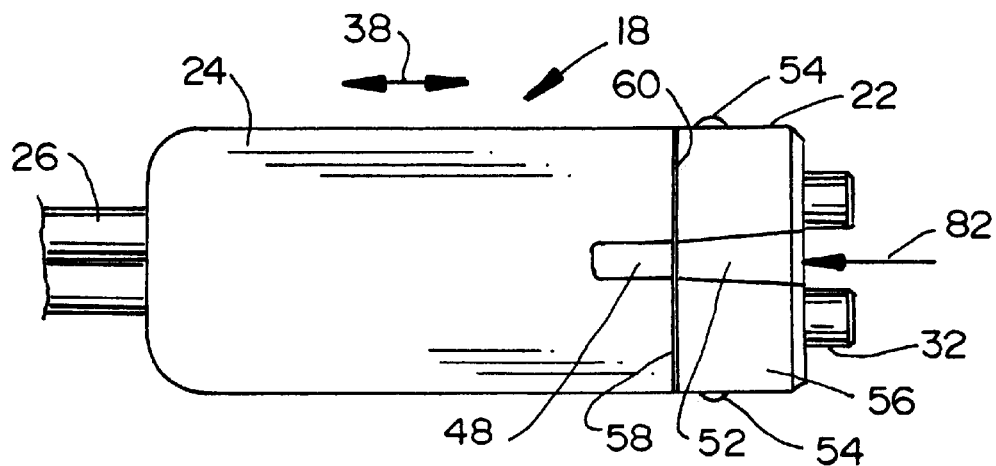
FIG. 5 is a bottom plan view of the plug connector.
Figure 6:
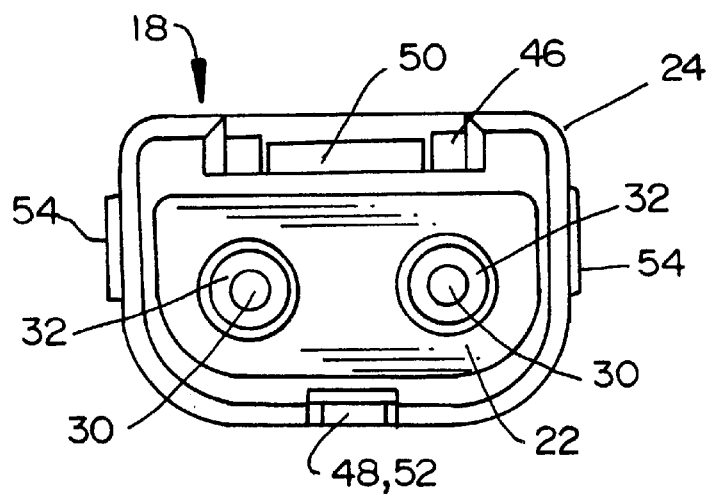
FIG. 6 is a front elevational view of the plug connector.

With that understanding, reference is made to FIGS. 3–9 in conjunction with FIGS. 1 and 2 to first describe plug connector 18. The plug connector is a two-part connector including a plug housing 22 which is shown isolated in FIG. 8, and a sheath 24 mounted about the plug housing. The sheath is shown isolated in FIG. 7. The plug connector terminates a fiber optic cable 26 which is bifurcated as shown in FIG. 3 to include a pair of optical cables 28 having stripped fiber cores 30 (FIGS. 1 and 2) extending forwardly into a pair of cylindrical plug portions 32 of plug housing 22. Fiber optic cable 26 extends into plug connector 18 through an aperture 34 (FIG. 7) of sheath 24. Cable fasteners 36 fix fiber optic cable 26 within the plug connector by piercing through the outer cladding of the cable about fiber cores 30. The plug connector is mated and unmated with the receptacle connector in the direction of double-headed arrow 38 in FIG. 1. In other words, the plug connector is mateable longitudinally of fiber optic cable 26.

Figure 7:
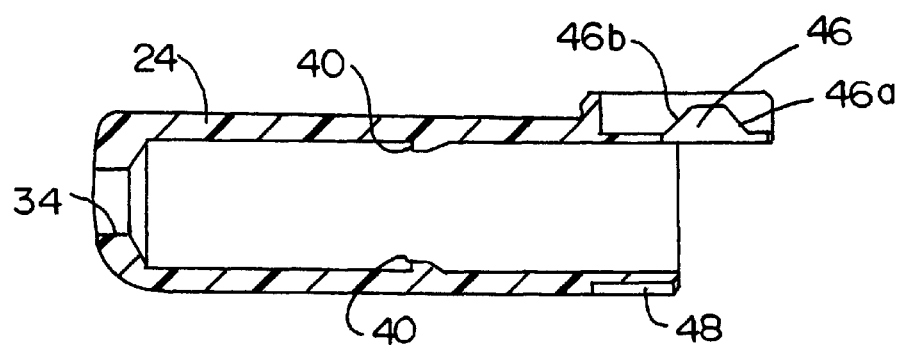
FIG. 7 is a longitudinal section through the sheath of the plug connector.
Figure 8:
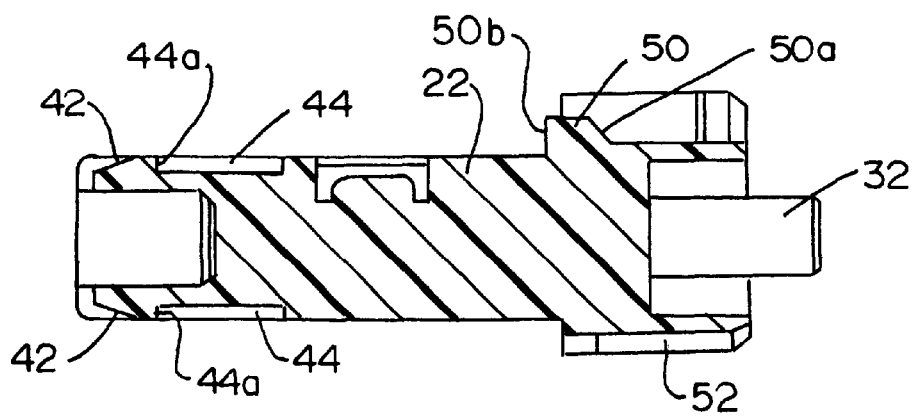
FIG. 8 is a longitudinal section through the plug housing of the plug connector.
Figure 9:
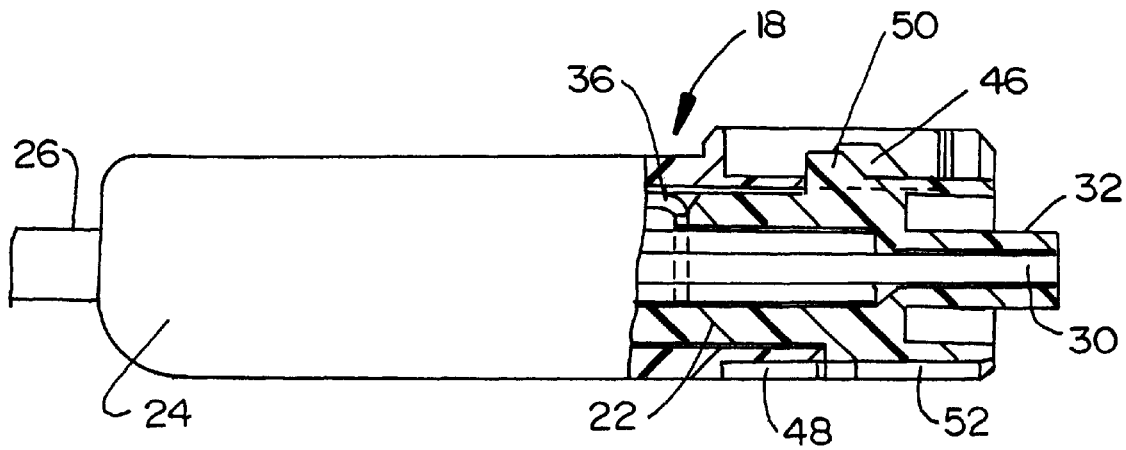
FIG. 9 is a view similar to that of FIG. 1, but with the receptacle connector removed.
Figure 10:
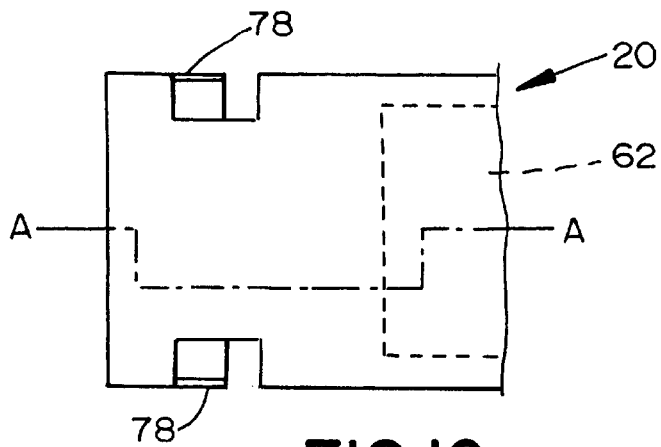
FIG. 10 is a fragmented top plan view of the receptacle connector.
Figure 11:
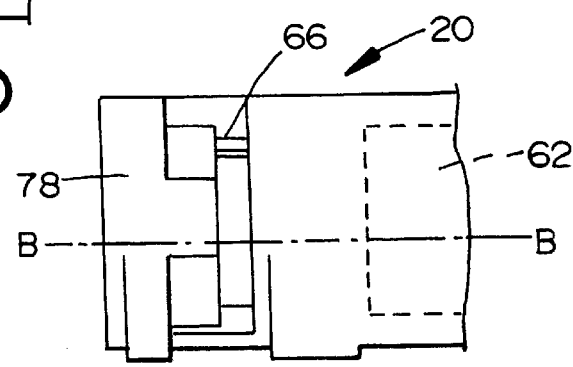
FIG. 11 is a fragmented side elevational view of the receptacle connector.

As seen best in FIGS. 7 and 8, sheath 24 is secured about plug housing 22 of plug connector 18 by means of a pair of ramped detents 40 on the inside of the sheath at the top and bottom thereof The sheath is slidably mounted onto the plug housing in the direction of arrow 41 (FIG. 1), and ramped detents 40 ride over a pair of ramps 42 (FIG. 8) at the top and bottom of plug housing 22. The ramped detents will snap into a pair of securing recesses 44 and lock behind a pair of shoulders 44a immediately behind ramps 42.

As best seen in FIG. 7, sheath 24 has a release boss 46 at the top front end thereof. The release boss has a forward ramped surface 46a and a rearward ramped surface 46b. A slot 48 is formed in the bottom of the sheath, the dimensions of the slot being seen best in FIG. 5.

As best seen in FIG. 8, plug housing 22 of plug connector 18 includes a primary latch boss 50 at the top thereof. The primary latch boss defines a forward ramped surface 50a and a rearward latch shoulder 50b. A slot 52 is formed in the bottom of the plug housing, the dimensions of the slot being seen best in FIG. 5.

Referring to FIGS. 3–6, a pair of rounded secondary latch bosses 54 project outwardly from opposite sides of an enlarged front portion 56 of the plug housing. Enlarged portion 56 defines a rearwardly facing abutment shoulder 58 which engages a forwardly facing abutment shoulder 60 of sheath 24 when the sheath is in its forwardmost position.

Referring to FIGS. 10–14 in conjunction with FIGS. 1 and 2, receptacle connector 20 can take a wide variety of configurations and, therefore, only the mating end of the receptacle connector is shown. The remainder of the connector has been severed along lines X—X in FIGS. 1 and 2 as well as in the remaining figures. Suffice it to say, receptacle connector 20 has a generally open mating end 60 which, in this particular example, has an optical element adapter 62 on the inside thereof. The receptacle connector has a pair of cylindrical receptacles 64 for receiving cylindrical plug portions 32 of the plug housing as seen in FIGS. 1 and 2 where plug connector 18 is mated within the open mating end of receptacle connector 20.

Figure 13:
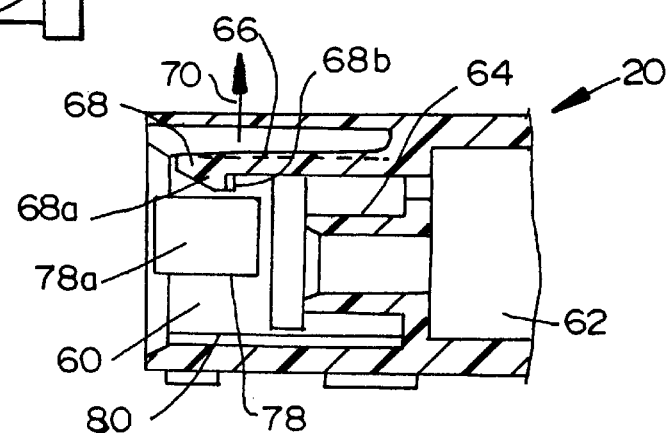
FIG. 13 is a fragmented section taken generally along line A—A in FIG. 10.

Receptacle connector 20 has complementary interengaging primary latch means operatively associated with primary latch boss 50 on plug housing 22 of plug connector 18. More particularly, as best seen in FIG. 13, receptacle connector 20 has a flexible, cantilevered primary latch arm 66 which has a latch hook 68 at the distal end thereof. The latch hook defines a forward ramped surface 68a and a rearward latch shoulder 68b. FIG. 1 clearly shows the complementary interengaging primary latch means between the two connectors, with latch hook 68 of the receptacle connector latched behind latch boss 58 of the plug connector. During mating, forward ramped surface 50a (FIG. 8) of primary latch boss 50 engages forward ramped surface 68a (FIG. 13) of latch hook 68 to flex primary latch arm 66 upwardly in the direction of arrow 70 (FIG. 13). When the connectors are fully mated, rearward latch shoulder 68b (FIG. 13) of the flexible primary latch arm snaps behind rearward latch shoulder 50b (FIG. 8) of primary latch boss 50 to latch the connectors in mated condition as seen in FIG. 1. The flexible latch arm also can ride over forward ramped surface 46a (FIG. 7) of release boss 56 of sheath 24.

The primary latch means 50/68 between the two connectors can be released by pulling sheath 24 rearwardly in the direction of arrow 72 (FIG. 2). This causes rearward ramped surface 46b of release boss 46 of the sheath to engage latch hook 68 and flex primary latch arm 66 of the receptacle connector upwardly as seen in FIG. 2 to unlatch the primary latch means between the connectors.

Figure 14:
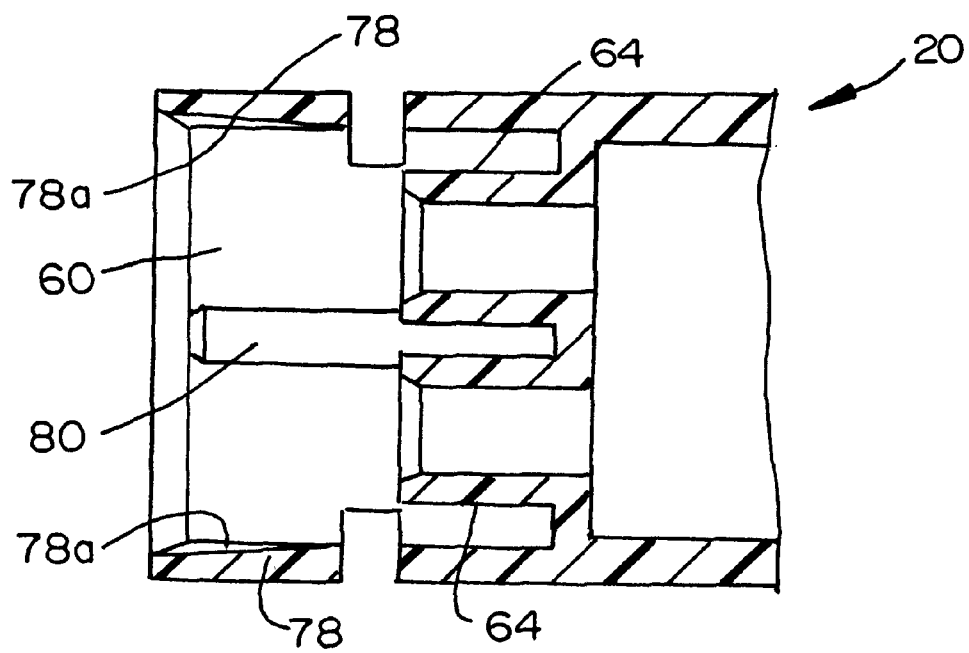
FIG. 14 is a fragmented section taken generally along line B—B in FIG. 11.
Figure 15:
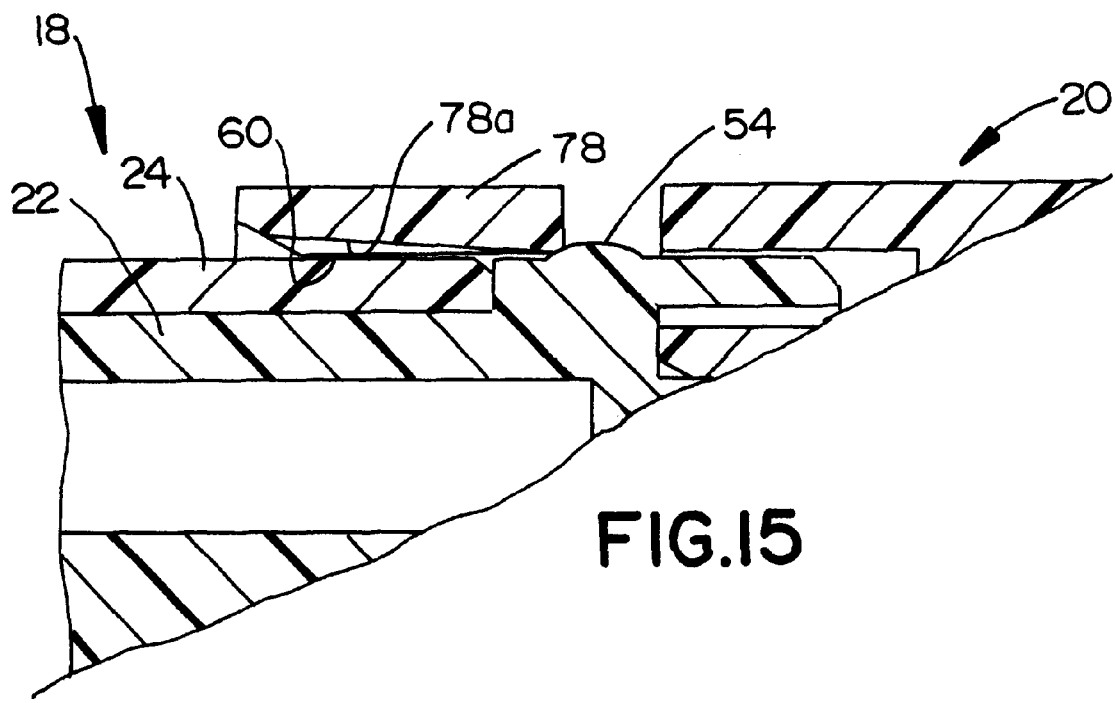
FIG. 15 is an enlarged fragmented section through the secondary latch means between the plug housing of the plug connector and the receptacle connector.

Generally, complementary interengaging secondary latch means are provided between the connectors to hold the connectors in mated condition in the event of inadvertent unlatching of the above-described primary latch means by movement of sheath 24. The secondary latch means is easily releasable for total unlatching of the connectors, if desired. More particularly, referring again to FIGS. 10–14 as well as FIG. 15, receptacle connector includes a pair of flexible latch members 78 on opposite lateral sides thereof. FIG. 14 shows that the inside surfaces 78a of latch members 78 converge inwardly. Therefore, when plug connector 18 is mated with receptacle connector 20, rounded secondary latch bosses 54 on opposite sides of enlarged portion 56 of plug housing 22 engage inside surfaces 78a of flexible latch members 78 of the receptacle connector, spreading the flexible latch members outwardly until secondary latch bosses 54 pass the distal ends of the latch members, whereupon the latch members snap back inwardly into latching engagement behind the secondary latch bosses. With the secondary latch bosses being rounded, the secondary latch means provided by flexible latch members 78 on the receptacle connector and secondary latch bosses 54 on the plug connector provide a redundant, readily releasable latch means, but a latch means sufficient to hold the connectors in mated condition should sheath 24 be inadvertently moved to temporarily release the primary latch means, such as under a condition of an abrupt shock or impact on the connector assembly.

Figure 12:
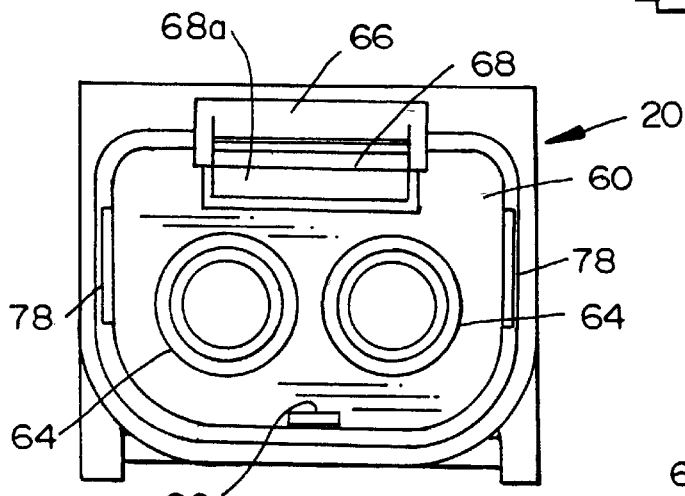
FIG. 12 is an elevational view of the mating end of the receptacle connector.

Generally, complementary interengaging press-fit rib-and-slot means are provided between the plug and receptacle connectors when the connectors are in mated condition. More particularly, FIGS. 12–14 show that receptacle connector 20 includes a rib 80 on the inside bottom of receptacle 60. This rib slides in the direction of arrow 82 (FIG. 5) into aligned slots 52 and 48 in plug housing 22 and sheath 24, respectively, of plug connector 18. Rib 80 is dimensioned to provide a tight press-fit between the rib and slots 52 and 48. However, it can be seen in FIG. 5 that slot 52 in plug housing 22 diverges at its outer open end to provide a lead-in mouth for the rib, but slot 52 narrows toward slot 48 in the sheath, so that the rib establishes a tight press-fit within both slots 52 and 48.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connector assembly, comprising:
   a plug connector including a plug housing and a sheath movably mounted about the plug housing;
   a receptacle connector for receiving the plug connector in mated condition;
   complementary interengaging primary latch means between the plug housing of the plug connector and the receptacle connector for holding the connectors in mated condition, the primary latch means being interengaged automatically in response to full mating of the connectors;
   release means on the sheath of the plug connector for unlatching said primary latch means in response to movement of the sheath relative to the plug housing, the release means normally being out of engagement with the primary latch means and being movable with the sheath into unlatching engagement with the primary latch means when the connectors are in said mated condition;
   complementary interengaging secondary latch means between the plug housing of the plug connector and the receptacle connector for holding the connectors in mated condition in the event of inadvertent unlatching of the primary latch means; and
   complementary interengaging press-fit rib-and-slot means between the plug housing of the plug connector and the receptacle connector when the connectors are in mated condition.

2. The connector assembly of claim 1 wherein said primary latch means include a flexible latch arm on one of said plug housing and receptacle connector engageable with a complementary latch member on the other of the plug housing and receptacle connector.

3. The connector assembly of claim 2 wherein said flexible latch arm is on one side of the receptacle connector and is engageable with a latch boss on one side of the plug housing of the plug connector.

4. The connector assembly of claim 2 wherein said release means comprises a release shoulder on the sheath engageable with said flexible latch arm in response to movement of the sheath relative to the plug housing.

5. The connector assembly of claim 1 wherein said secondary latch means include at least one flexible latch member on one of said plug housing and receptacle connector releasably engageable with a complementary latch member on the other of the plug housing and receptacle connector.

6. The connector assembly of claim 5 wherein said secondary latch means include a pair of said flexible latch members on opposite sides of the receptacle connector releasably engageable with a pair of latch bosses on opposite sides of the plug housing of the plug connector.

7. The connector assembly of claim 1 wherein said rib-and-slot means include a rib on the receptacle connector press-fit into a slot in the plug housing of the plug connector, the rib being elongated in a direction of mating of the connectors.

8. A connector assembly, comprising:
   a plug connector including a plug housing and a sheath movably mounted about the plug housing;
   a receptacle connector for receiving the plug connector in mated condition;
   complementary interengaging primary latch means between the plug housing of the plug connector and the receptacle connector for holding the connectors in mated condition, the primary latch means being interengaged automatically in response to full mating of the connectors;
   release means on the sheath of the plug connector for unlatching said primary latch means in response to movement of the sheath relative to the plug housing, the release means normally being out of engagement with the primary latch means and being movable with the sheath into unlatching engagement with the primary latch means when the connectors are in said mated condition; and
   complementary interengaging secondary latch means between the plug housing of the plug connector and the receptacle connector for holding the connectors in mated condition in the event of inadvertent unlatching of the primary latch means.

9. The connector assembly of claim 8 wherein said primary latch means include a flexible latch arm on one of said plug housing and receptacle connector engageable with a complementary latch member on the other of the plug housing and receptacle connector.

10. The connector assembly of claim 9 wherein said flexible latch arm is on one side of the receptacle connector and is engageable with a latch boss on one side of the plug housing of the plug connector.

11. The connector assembly of claim 9 wherein said release means comprises a release shoulder on the sheath engageable with said flexible latch arm in response to movement of the sheath relative to the plug housing.

12. The connector assembly of claim 8 wherein said secondary latch means include at least one flexible latch member on one of said plug housing and receptacle connector releasably engageable with a complementary latch member on the other of the plug housing and receptacle connector.

13. The connector assembly of claim 12 wherein said secondary latch means include a pair of said flexible latch members on opposite sides of the receptacle connector releasably engageable with a pair of latch bosses on opposite sides of the plug housing of the plug connector.

14. A connector assembly, comprising:
   a plug connector including a plug housing and a sheath movably mounted about the plug housing;
   a receptacle connector for receiving the plug connector in mated condition;
   complementary interengaging primary latch means between the plug housing of the plug connector and the receptacle connector for holding the connectors in mated condition;

complementary interengaging secondary latch means between the plug housing of the plug connector and the receptacle connector for holding the connectors in mated condition in the event of inadvertent unlatching of the primary latch means; and complementary interengaging press-fit rib-and-slot means between the plug housing of the plug connector and the receptacle connector when the connectors are in mated condition.

15. The connector assembly of claim 14 wherein said primary latch means include a flexible latch arm on one of said plug housing and receptacle connector engageable with a complementary latch member on the other of the plug housing and receptacle connector.

16. The connector assembly of claim 15 wherein said flexible latch arm is on one side of the receptacle connector and is engageable with a latch boss on one side of the plug housing of the plug connector.

17. The connector assembly of claim 14 wherein said secondary latch means include at least one flexible latch member on one of said plug housing and receptacle connector releasably engageable with a complementary latch member on the other of the plug housing and receptacle connector.

18. The connector assembly of claim 17 wherein said secondary latch means include a pair of said flexible latch members on opposite sides of the receptacle connector releasably engageable with a pair of latch bosses on opposite sides of the plug housing of the plug connector.

19. The connector assembly of claim 14 wherein said rib-and-slot means include a rib on the receptacle connector press-fit into a slot in the plug housing of the plug connector, the rib being elongated in a direction of mating of the connectors.

20. A connector assembly, comprising:

a plug connector including a plug housing and a sheath movably mounted about the plug housing;

a receptacle connector for receiving the plug connector in mated condition;

complementary interengaging primary latch means between the plug housing of the plug connector and the receptacle connector for holding the connectors in mated condition;

release means on the sheath of the plug connector for unlatching said primary latch means in response to movement of the sheath relative to the plug housing; and complementary interengaging secondary latch means between the plug housing of the plug connector and the receptacle connector for holding the connectors in mated condition in the event of inadvertent unlatching of the primary latch means, said rib-and-slot means including a rib on the receptacle connector press-fit into a slot in the plug housing of the plug connector, the rib being elongated in a direction of mating of the connectors, the slot extending in both the plug housing and the sheath of the plug connector.

21. A connector assembly, comprising:

a plug connector including a plug housing and a sheath movably mounted about the plug housing;

a receptacle connector for receiving the plug connector in mated condition;

complementary interengaging primary latch means between the plug housing of the plug connector and the receptacle connector for holding the connectors in mated condition;

complementary interengaging secondary latch means between the plug housing of the plug connector and the receptacle connector for holding the connectors in mated condition in the event of inadvertent unlatching of the primary latch means; and complementary interengaging press-fit rib-and-slot means between the plug housing of the plug connector and the receptacle connector when the connectors are in mated condition, said rib-and-slot means including a rib on the receptacle connector press-fit into a slot in the plug housing of the plug connector, the rib being elongated in a direction of mating of the connectors, the slot extending in both the plug housing and the sheath of the plug connector.

\* \* \* \* \*